US010064514B2

(12) United States Patent
Gunstone et al.

(10) Patent No.: US 10,064,514 B2
(45) Date of Patent: Sep. 4, 2018

(54) HANDLING DEVICE WITH MOVABLE CAPSULE EJECTOR

(71) Applicant: NESTEC S.A., Vevey (CH)

(72) Inventors: Andrew Gunstone, Villars-le-Terroir (CH); Enzo Bonacci, Savigny (CH); Jean-Marc Flick, Pomy (CH)

(73) Assignee: Nestec S.A., Vevey (CH)

( * ) Notice: Subject to any disclaimer, the term of this patent is extended or adjusted under 35 U.S.C. 154(b) by 89 days.

(21) Appl. No.: 15/101,994

(22) PCT Filed: Dec. 5, 2014

(86) PCT No.: PCT/EP2014/076664
§ 371 (c)(1),
(2) Date: Jun. 6, 2016

(87) PCT Pub. No.: WO2015/082663
PCT Pub. Date: Jun. 11, 2015

(65) Prior Publication Data
US 2016/0302608 A1    Oct. 20, 2016

(30) Foreign Application Priority Data
Dec. 6, 2013   (EP) ................................ 13196040

(51) Int. Cl.
*A47J 31/36*   (2006.01)
(52) U.S. Cl.
CPC ....... *A47J 31/3638* (2013.01); *A47J 31/3633* (2013.01)
(58) Field of Classification Search
CPC .................................................. A47J 31/3638

USPC ..................................... 99/295, 289 R, 302 P
See application file for complete search history.

(56) References Cited

U.S. PATENT DOCUMENTS

| 8,166,869 B2 * | 5/2012 | Cheng | A47J 31/3638 99/295 |
| 8,613,246 B2 * | 12/2013 | Ryser | A47J 31/3633 99/289 R |
| 8,647,691 B2 * | 2/2014 | Kruger | A47J 31/3633 426/431 |
| 9,351,602 B2 * | 5/2016 | Icardi | A47J 31/3633 |

FOREIGN PATENT DOCUMENTS

| EP | 2484252 | * | 8/2012 | .......... A47J 31/3638 |
| WO | 2008096385 | | 8/2008 | |
| WO | WO 2010/004376 A | * | 1/2010 | .......... A47J 31/3638 |
| WO | 2010103044 | | 9/2010 | |
| WO | 2013150480 | | 10/2013 | |

* cited by examiner

*Primary Examiner* — Reginald L Alexander
(74) *Attorney, Agent, or Firm* — K&L Gates LLP

(57) ABSTRACT

A device (1) handles selectively a first capsule (2a) having a first flange (2a') and a second capsule (2b) having a second flange (2b') greater than the first flange (2a'). The device comprises a first part (10) and a second part (20) that are relatively movable from a transfer position for inserting and/or removing such capsule (2a, 2b) to an extraction position for extracting such capsule (2a, 2b). The device further comprises separation means (33) for separating such capsule (2a, 2b) from at least one of the first and second parts (10,20) when the first and second parts (10,20) are relatively moved from the extraction position to the transfer position.

20 Claims, 7 Drawing Sheets

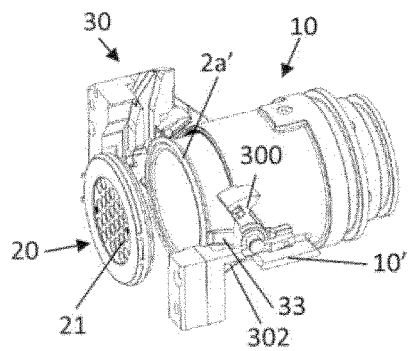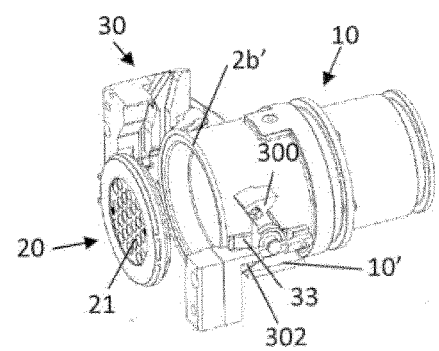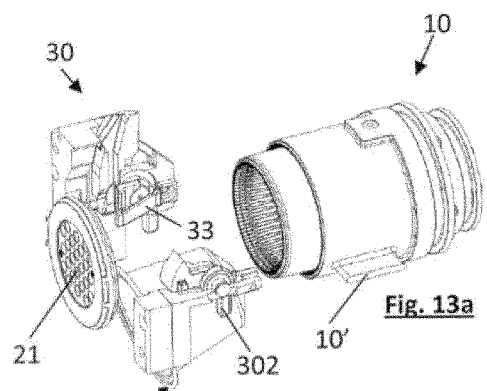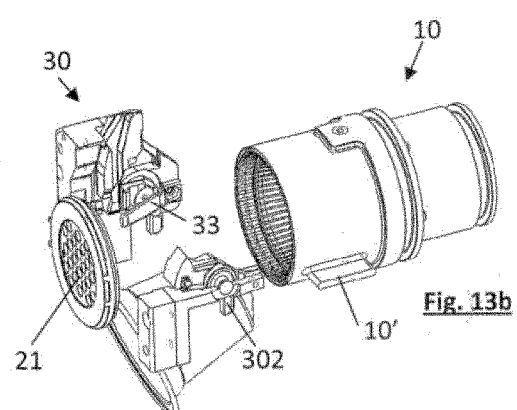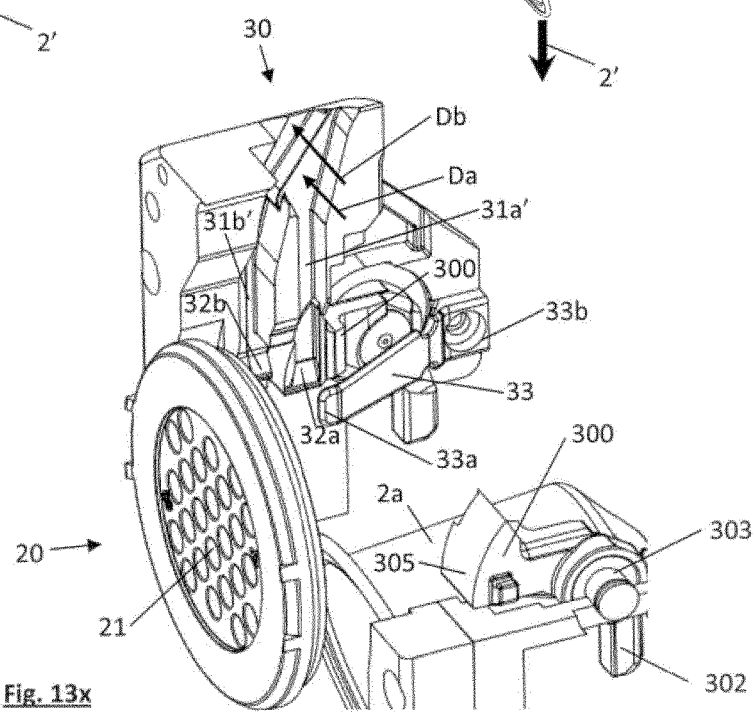

HANDLING DEVICE WITH MOVABLE CAPSULE EJECTOR

CROSS REFERENCE TO RELATED APPLICATIONS

The present application is a National Stage of International Application No. PCT/EP2014/076664, filed on Dec. 5, 2014, which claims priority to European Patent Application No. 13196040.3, filed Dec. 6, 2013, the entire contents of which are being incorporated herein by reference.

FIELD OF THE INVENTION

The field of the invention pertains to a device for handling capsules, in particular handling device for beverage machines using capsules of an ingredient of the beverage to be prepared. The invention also relates to a combination of the device and the capsule, to a method of handling the capsule with the device and to a use of a capsule for the device.

For the purpose of the present description, a "beverage" is meant to include any human-consumable liquid substance, such as tea, coffee, hot or cold chocolate, milk, soup, baby food, etc. . . . . . A "capsule" is meant to include any pre-portioned beverage ingredient, such as a flavouring ingredient, within an enclosing packaging of any material, in particular an airtight or air-permeable packaging, e.g. plastic, aluminium, recyclable and/or biodegradable packagings, and of any shape and structure, including soft pods or rigid cartridges containing the ingredient.

BACKGROUND ART

One problem encountered is the positioning of the capsule in the device and the closing of the latter around the capsule to perform the brewing process. The capsule usually has to be positioned by the user on a capsule support or in a housing, then the device is closed manually or automatically around the capsule.

It is important to correctly position the capsule so that the device closes correctly around the latter and a good seal is thus achieved to ensure good conditions of extraction. Bad positioning may damage the capsule, and thus affect the conditions of extraction. The loading of the capsule must also be easy, without trial and error as to the correct position of the capsule in the device. The loading must also be as rapid as possible and not require excessive manipulations. Hence, devices exist that propose the insertion of the capsule in a vertical plane and the movement of the extraction or infusion parts along a horizontal plane around the capsule. Such systems have the advantages of allowing a loading from the top piggy-bank fashion, and makes for rapid loading. The positioning of the capsule is then taken over by the movement of a movable part that pushes the capsule against another part such as a water heater. However, these devices are complex to produce and are not suitable for low-cost and therefore entry-level coffee machines for the consumer market. They are therefore usually intended for the business market such as restaurants, bars or communities. For example, patent application WO 98/47418 relates to a device for the extraction of pre-measured inserts in which the inserts are inserted vertically and are extracted horizontally. The disadvantage of this device is that it comprises two movable parts for the extraction, which makes the mechanical principle more complicated.

WO 2005/004683 relates to a capsule brewing device comprising: a first part; a second part that can be moved relative to the first part; a housing for the capsule and defining, in a closed position of the movable part against the fixed part, an extraction position of the capsule along an axis in said housing; an insertion and positioning part comprising means for guiding the capsule arranged so as to insert the capsule by gravity and position such capsule in an intermediate position; a drink pouring system; and the second movable part is so arranged and constructed to move the capsule from the intermediate position into the extraction position when the device is closed.

EP 1 721 553 discloses a brewing unit for coffee machines using capsules. The unit has a front part with a beverage outlet and a rear part with a hot water inlet. The front part and the rear part are mounted in-between a pair of facing shoulder guide members. The front part is movable in-between these guide members to be urged against the rear part so as to form with the rear part a brewing chamber for accommodating a capsule to be extracted, whereby an unoccupied volume is left in front of the front member between the guide members within the machine.

EP 1 659 547 relates to a beverage machine for making infusions, in particular, espresso coffee. The machine includes an infusion chamber within a brewing unit that has a movable front part with a return spring and a beverage outlet duct that extends through the assembly's outer housing. The movable front part cooperates with a rear part that is movable within the housing and that can be pushed against the movable front part to compress the return spring whereby the outlet duct slides through the assembly's outer housing. The capsule is passed through the external housing to the infusion chamber via a rigid capsule feed channel and then the capsule is transferred into the infusion chamber by an external bushing on the movable rear part of the brewing unit which is provided with a cam-like path for moving the rear part. This arrangement involves several problems. The capsule must be moved during the closure of the brewing chamber and this can cause blocking and it also makes the retaining means of the pod more complex. Moreover, opening and closing the brewing chamber involves simultaneously a linear displacement of the movable rear part within the housing, of the movable front part within the housing and of the outlet duct through the housing which increases the risk of hyper-guiding and jamming or improper alignment of the various parts that linearly move one relative to another. The fluid system comprises a moving assembly which makes the fluid system more complex to assemble. When upon extraction brewing unit is re-opened for removing the capsule, pressurized water contained within the infusion chamber may project outside the housing. Furthermore, an unoccupied volume is left within the machine between the front member and the casing when the outlet duct is in its retracted position.

U.S. Pat. No. 3,260,190 and WO 2005/072574 disclose a coffee machine having a removable drawer for positioning a coffee can therein. The drawer can be slid horizontally into the coffee machine and lifted towards a water injection arrangement. WO 2006/023309 discloses a coffee machine with a slidable drawer for the introduction of a coffee capsule into the machine. The drawer is movable between an open and a closed position and has two capsule half-shells that are pivotable against each other to form a brewing chamber when the drawer is in the closed position and pivotable apart when the drawer is slid out from the machine. U.S. Pat. No. 6,966,251 discloses a coffee machine having a horizontally slidable drawer for positioning a capsule therein. When slid into the machine, the drawer can be moved upwards towards a fixed capsule cage for form a brewing chamber for a capsule. EP 1 566 126 discloses a coffee machine with a vertical brewing unit for accommodating coffee pods. The brewing unit has a fixed upper part and a movable lower part for holding a pod and that can be pulled up for closing the brewing unit and let down for inserting or removing a pod.

Further brewing units are disclosed in EP 0 730 425, EP 0 862 882, EP 1 219 217, EP 1 480 540, EP 1 635 680, EP 1 669 011, EP 1 774 878, EP 1 776 026, EP 1 893 064, FR 2 424 010, U.S. Pat. No. 3,260,190, U.S. Pat. No. 4,760,774, U.S. Pat. No. 5,531,152, U.S. Pat. No. 7,131,369, US 2005/0106288, US 2006/0102008, WO 2005/002405, WO 2005/016093, WO 2006/005756, WO 2006/066626 and WO 2007/135136.

A devices arranged to handle ingredient capsules of different sizes are disclosed in EP 1 208 782 and in WO 2012/123440. Further devices for handling capsules of different sizes are disclosed in PCT/EP13/064001, PCT/EP13/064003, PCT/EP13/070756, PCT/EP13/070780, PCT/EP13/070866, PCT/EP13/071453, EP2012197961.1 and EP2012197963.7.

There is still a need to provide a device for handling reliably capsules, in particular capsules of different sizes.

SUMMARY OF THE INVENTION

It is an object of the present invention to provide a device for handling capsules, in particular ingredient capsules in a beverage preparation machine.

In a particular embodiment, the invention relates to a device for handling capsules containing at least one ingredient typically to prepare a beverage from such ingredient in a beverage machine. For instance, the machine is a coffee, tea, chocolate, cacao, milk or soup preparation machine. For instance, the machine is arranged for preparing within a processing module a beverage by passing hot or cold water or another liquid through a capsule containing an ingredient, such as a flavouring ingredient, of the beverage to be prepared, such as ground coffee or tea or chocolate or cacao or milk powder.

Such beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed on user-request, which corresponds to a serving. The volume of such a serving may be in the range of 25 to 200 ml, e.g. the volume for filling a cup or mug, depending on the type of beverage. Formed and dispensed beverages may be selected from ristrettos, espressos, lungos, cappuccinos, café latte, americano coffees, teas, etc. . . . . For example, a coffee machine may be configured for dispensing espressos, e.g. an adjustable volume of 20 to 60 ml per serving, and/or for dispensing lungos, e.g. a volume in the range of 70 to 150 ml per serving.

Typically, the ingredient is contained in a capsule having an aluminium or plastic or paper enclosure and supplied within the capsule to the processing module of the machine.

The capsule may have a flange, e.g. a rim, and a receptacle that is symmetric or asymmetric relative to the flange, conical or frusto-conical or cylindrical or spherical or hemispherical or frusto-spherical, for holding the capsule content, such as a beverage ingredient, e.g. ground coffee, tea or cacao or another beverage ingredient. The flange may be deformed while it is handled by the device, e.g. the flange may be urged beyond stop means of the variety below.

In particular, the invention relates to a device for handling selectively a first capsule having a first flange and a second capsule having a second flange greater than the first flange. The device comprises a first part and a second part that are relatively movable from a transfer position for inserting and/or removing such capsule to an extraction position for extracting such capsule.

In accordance with the invention, the device further comprises separation means for separating such capsule from at least one of the first and second parts, such as from a cavity in the at least one of the first and second parts, when the first and second parts are relatively moved from the extraction position to the transfer position.

The separation means typically comprise a separator body which is configured to act against either of the first and second flanges.

The separation means may be movable to adapt spatially to either of the first and second flanges. The separation means may include an engaging portion that is movable to a first position for engaging with the first flange and to a second position for engaging with the second flange. Optionally, the separation means is movable to a position for resting and/or a position for allowing the passage of the relatively moving first and second parts.

The separation means can be resiliently movable for acting against the first and second flanges and positionable (e.g. pushed into a proper position) by the first and second capsules, for instance by first and second capsule receptacles of the first and second capsules, to engage with the first and second flanges.

The separation means may include a separator that has a capsule engaging portion and an anchorage portion for mounting the separator in such device, e.g. to a frame or a movable part of such device. Optionally, the engaging portion forms a ram for acting against the capsule, for instance against the capsule flange, for separating such capsule from at least one of the first and second parts, for example from a cavity thereof.

The separation means may include a pair of separators. At least one of the first and second parts can be located between the separators when in the extraction position. A capsule may be located between the separators when in the extraction position.

In one embodiment, at least one of the first and second parts has a cavity for receiving a capsule receptacle of such capsule. The separation means can be movable relatively to the cavity so that the capsule flange of such capsule is intercepted by the separation means moving relatively to the cavity when the first and second parts are relatively moved from the extraction position to the transfer position to separate the capsule receptacle from the cavity.

The device can further include a third part for guiding the capsule to inbetween the first and second parts when in the transfer position. Optionally, the third part is fixed to at least one of: the first part, the second parts and the separation means. The third part is for instance assembled thereto or integral therewith. The third part may have:

a first portion for engaging with and guiding the first flange of the first capsule; and
  a second portion for engaging with and guiding the second flange of the second capsule, for guiding the capsule to inbetween the first and second parts in the transfer position. The third part can be so configured that: the first portion is bypassed by the second flange when the second capsule is guided to inbetween the first and second parts in the transfer position; and the second portion is bypassed by the first flange when the first capsule is guided to inbetween the first and second parts in the transfer position.

Hence, to handle capsules of different dimensions, the handling device may be provided with two insertion guiding paths, i.e. defined by the first and second portions, that can discriminate geometrically between flanges of differently sized flanges of the differently dimensioned capsules. However, other flange discrimination arrangements are also contemplated, e.g. magnetically or electromagnetically or optically or other sensing arrangement, with a controlled gate arrangement for the access by the flanges of the first and second portions.

For instance, the third part has at least one of:
- a branching portion, such as a wedge arrangement, for directing the first flange to the first portion and the second flange to the second portion;
- a common portion for engaging with any of the first and second flanges and for guiding the flanges either to the first portion or the second portion; and
- a window for allowing any of the capsules into the third part, the window having optionally a shape that generally corresponds to an outermost boundary of superimposed transverse cross-sections of the first and second capsules.

The first portion can have a first flange engagement and guiding arrangement dimensioned for the first flange, the second portion having a second flange engagement and guiding arrangement dimensioned for the second flange. Optionally, the second arrangement is larger than the first arrangement.

The first portion may have a first flange engagement and guiding arrangement comprising facing rails or grooves for engaging with generally opposite and corresponding matching edges of the first flange. The second portion can have a second flange engagement and guiding arrangement comprising facing rails or grooves for engaging with generally opposite and corresponding matching edges of the second flange. Optionally, the first and second portions have the facing rails or grooves such that: the facing rails or grooves of the first portion are spaced apart by a first spacing distance adjusted to the first flange, and the facing rails or grooves of the second portion are spaced apart by a second spacing distance adjusted to the second flange, the second spacing distance being greater than the first spacing distance. Optionally the first spacing distance is smaller than a dimension of the second flange extending between the facing rails or grooves of the second portion when the second flange is guided by the facing rails or grooves of the second portion.

The third part may include stop means for stopping the capsule inbetween the first and second parts so that, when the first and second parts are moved from the transfer position to the extraction position, the capsule can be taken over (and usually secured) by the first and second parts for extraction.

For instance, the stop means may be configured for successively: stopping the capsule inbetween the first and second parts in the transfer position; maintaining the capsule while the first and second parts are relatively moved from the transfer position towards the extraction position to receive the capsule; and allowing a liberation of the capsule from the stop means after reception of the capsule by at least one of the first and second parts while relatively moving towards the extraction position.

The stop means can comprise at least one member for stopping the first capsule flange after engagement in the first portion and/or for stopping the second capsule flange after engagement in the second portion. Optionally, the stop means include:
- at least one pair of facing members for stopping therebetween the first capsule flange and/or the second capsule flange; and/or
- at least a first member for stopping the first capsule flange and at least one second member for stopping the second capsule flange; and/or
- a pair of facing first members for stopping therebetween the first capsule flange and a pair of facing second members for stopping therebetween the second capsule flange, optionally the facing first members being spaced apart by a distance that is smaller than the spacing distance of facing second members and/or the facing first members being spaced apart by a distance that is smaller than the dimension of the first flange and the facing second members being spaced apart by a distance that is smaller than the dimension of the second flange.

The first portion may comprise a first flange section that is movable between a first position for engaging with the first flange and a second position for freeing a passage for the second capsule and/or for at least one of the first and second parts, e.g. in a configuration for receiving the second capsule. The second portion can comprise a second flange section that is movable between a first position for engaging with the second flange and a second position for freeing a passage for the first capsule and/or for at least one of the first and second parts, e.g. in a configuration for receiving said first capsule. At least one of the first and second parts may include an actuator for actuating the flange section.

The third part can have a flange section that has a first position for engaging with and guiding the capsule flange when the first and second parts are in the transfer position before liberation of such capsule from the stop means.

The first part and the second part may be relatively movable across a space from the transfer position for inserting and/or removing such capsule to an extraction position for extracting such capsule. For instance, the flange section in the first position can extend into this space, the flange section being moved after the capsule liberation from its first position to a second position in which the flange section is retracted from this space to allow the crossing thereof by the at least one of the first and second parts. The flange section may bear at least part of the stop means. The flange section can be:
- pivotable or translatable between its first and second positions, the flange section being in particular pivotable about an axis that is generally orthogonal or at an angle to a movement direction of the relatively movable first and second parts; and/or
- provided with at least one plain bearing surface for a guidance of the flange section between its first and second position, optionally the flange section being provided with two parallel or concentric bearing surfaces; and/or
- part of a portion for engaging with and guiding the flange of the capsule, the portion having a flange engagement and guiding arrangement comprising facing rails or grooves for engaging with generally opposite and corresponding matching edges of the flanges.

At least one of the first and second parts may include an actuator for actuating the flange section between its first and second positions. Optionally, the flange section has a dive arm that is actuated by the actuator.

At least one of the first and second parts may be arranged to take selectively a first configuration for receiving a first capsule and a second configuration for receiving a second capsule larger than the first capsule. The at least one of the first and the second parts arranged to take selectively the first and second configurations may include the actuator that is moved between its first and second positions by changing the configuration of the at least one of the first and the second parts.

The first and second parts in their first configuration can be relatively movable across the first space and the first and second parts in their second configuration can be relatively movable across the second space that is larger than the first space, the flange section in its first position extending into the second space and being moved into its second position when the first and second parts in their second configuration are moved to the extraction position, and the flange section in its first position: extending into the first space and being moved into its second position when the first and second parts in their first configuration are moved to the extraction position; or remaining outside the first space and remaining in the first position while the first and second parts in their first configuration are moved from the transfer position to the extraction position; or extending into the first and second spaces and being moved into its second position when the first and second parts in their first configuration or in their second configuration are moved to the extraction position.

At least one of the first and second parts can be arranged to take selectively a first configuration for receiving the first capsule and a second configuration for receiving the second capsule. At least one of the first and the second parts arranged to take selectively the first and second configurations may include the above actuator that is moved between its first and second positions by changing the configuration of the at least one of the first and the second parts.

The third part can be fixed to the first part or to the second part, the third part being for example integral with or assembled to the part it is fixed to.

At least one of the first and second parts can be arranged to take selectively a first configuration for receiving the first capsule and a second configuration for receiving the second capsule. The at least one of the first and the second parts arranged to take selectively the first and second configurations may include the above actuator that is optionally moved between first and second positions of the actuator by changing the configuration of the at least one of the first and the second parts.

The invention also relates to a system comprising a capsule and a device as described above.

Another aspect relates to a method for handling selectively a first capsule having a first flange and a second capsule having a second flange greater than the first flange in a device as described above. The method includes:
separating by the separation means such capsule from at least one of the device's first and second parts, such as from a cavity in the at least one of the first and second parts; while
relatively moving the first and second parts from the extraction position to the transfer position.

Optionally such capsule is removed from inbetween the first and second parts, in particular under the effect of gravity.

A further aspect of the invention relates to a use of a capsule selected from a first capsule having a first flange and a second capsule having a second flange greater than said first flange for: being handled in a device as described above; implementing a system as described above comprising such capsule and device; or carrying out a method as described above for handling such capsule. Such capsule is separated by the separation means from at least one of the device's first and second parts, such as from a cavity in the at least one of the first and second parts; while or upon relatively moving the first and second parts from the extraction position to the transfer position.

The third part can be fixed to at least one of: the first part, the second part and the separation means, the third part being in particular assembled thereto or integral therewith.

The arrangement of the handling device, e.g. the third part, for guiding the capsule to inbetween the first and second parts when in the transfer position may delimit a capsule passage, e.g. a chimney, that is generally upright so that the capsule is movable in the passage under the effect of gravity. The passage may extend generally perpendicularly to the direction of movement of the relatively moving first and second parts (or at a small angle to this perpendicular orientation, e.g. in the range of 1 to 30 deg or 3 to 15 deg.) The passage may be vertical or at an angle to the vertical, e.g. 0 to 45 deg. to the vertical, such as less than 30 or 15 deg. to the vertical, in particular 3 to 10 deg. to the vertical.

Typically, the device is mounted in a beverage preparation machine that comprises a stationary structure, such as a housing and/or a frame. The structure may be arranged to rest on a support surface such as a table. The capsule passage may be stationary relative to the structure.

The handling device may comprise or be associated with a motor for moving the first and second parts between the transfer and the extraction positions.

The handling device typically has a first part and a second part movable relative to the first part from a position for extracting therein a capsule to a transfer position for inserting a capsule into the handling device and/or for evacuation thereof from the handling device. Examples of operating principles of handling devices that can be adapted to the present handling device are disclosed in WO2005/004683, EP 2 068 684, EP 2 205 133, WO 2011/042400, WO2012/025258 and WO2013/127476 and in the references cited therein. The first and second relatively movable parts may be relatively movable manually, semi-automatically and/or automatically, in particular by an electric motor and/or hydraulically.

In the context of the present invention, the "first part" and the "second part" may refer to a single component typically assembling different functions, e.g. mechanical guiding function, mechanical holding function, mechanical piercing function, flow function, pressure function, etc. . . . , and/or refer to a plurality of components associating the desired function(s). The second part of the handling device can be made movable relative to the first part and relative to the stationary structure. The first part may be stationary relative to the structure or movable thereto. The second part can be arranged to move in a direction, in particular an arched and/or linear direction. Typically, the first and second parts in their extraction position delimit a chamber for housing the ingredient capsule, such as tea or coffee or chocolate or powder milk capsule. The handling device may be integrated in a processing module that includes an upstream fluid circuit for delivering a carrier liquid, such as water, into the chamber and a downstream fluid circuit having a beverage outlet for delivering from the chamber the beverage formed by the carrier liquid that is flavoured by the beverage (flavouring) ingredient of the capsule.

The handling device, when adapted to handle capsules of different sizes, e.g. different length, may for example integrate the teaching disclosed in PCT/EP13/070756, PCT/EP13/070866, PCT/EP13/071453, EP2012197961.1 and EP2012197963.7.

The handling device may be arranged to operate with closed or partly closed capsules that need to be opened prior to extraction, e.g. by appropriate openers as for example disclosed in EP0512468, EP0512470, EP2013180164.9, EP2013180165.6, EP2013180166.4, PCT/EP2013/073530 and the references cited therein. Alternatively, the capsules may be opened in which case the handling device does not need to incorporate any capsule opener, e.g. an extraction chamber delimited by the handling device is provided with a simple inlet and outlet and optionally a sieve.

For supplying capsules into the handling device, such device may incorporate or be associated with a capsule positioner, e.g. incorporating the teaching disclosed in PCT/EP13/064001 and PCT/EP13/064003.

To increase the automation of the capsule handling and/or the capsule extraction, the device may incorporate or be associated with a capsule sensing arrangement and capsule handling and/or extraction control, e.g. incorporating the teaching of WO 2012/123440.

The beverage preparation machine with the handling device may be adapted for processing capsules of a first type having a first size and capsules of a second type having a second size. For example, the capsules are provided with flanges, e.g. guiding flanges as discussed above, and differ from each other at least by the size of their respective flanges. The beverage preparation machine may further comprise a size sensing arrangement configured to:
  detect a presence of a capsule in the positioner; and/or
  determine a size information by measuring a size of said detected capsule and comparing said measured size to the first and the second size; and/or
  send the size information to the processing module.

For example, the first and the second type of capsules have different dimensions and/or volumes for containing the ingredient. The handling device may be adapted to handle more than two types of capsules.

For instance, the size sensing arrangement may be adapted to detect the presence of a capsule in the positioner by receiving or reading information from the capsule, and/or by measuring at least one of the following characteristic of the capsule: spectral property, colour, electrical property, resistivity, capacitance, electromagnetic property, magnetic induced field, mechanical property, geometry, weight, identifying information, code bar, emitted or reflected signal.

For instance, the size sensing arrangement may be configured to detect a presence of a capsule in the positioner by detecting if a metallic object is present in the positioner. The size sensing arrangement may comprise an inductive detection arrangement configured to detect a presence of a capsule in the positioner by producing with a sensing element an electro-magnetical field in the positioner and by detecting variations of said electro-magnetical field induced by the presence of a capsule of the first or the second type.

The machine typically includes a control unit, in particular a unit for controlling the processing module and optionally the handling device. The control unit may comprise a power management module arranged to power the control unit and optionally further electric components, such as a user-interface and/or a thermal conditioner in particular a heater and/or a cooler. The machine may have a control unit for controlling the processing module, the control unit being arranged to initiate automatically beverage preparation when the ingredient capsule is in the handling device in the extraction position. Insertion of the ingredient capsule into the handling device may be detected by any system, e.g. as known in the art such as an optical detection.

The processing module can be configured to circulate automatically a mixing and/or infusion liquid to the ingredient of the capsule in the handling device when the first and second parts reach the extraction position, e.g. a closed position.

BRIEF DESCRIPTION OF THE DRAWINGS

The invention will now be described with reference to the schematic drawings, wherein:

FIGS. 6a to 13a and 6b to 13b illustrate, in a perspective views from the side and above, two handling sequences of two capsules differing by their size in the device of FIG. 1, FIG. 13x being an enlarged view of a portion of FIG. 13a;

FIGS. 14a to 17a and 14b to 17b illustrate, in a perspective views from below, two handling sequences (side-by-side) of two capsules of different size using the device of FIG. 1.

DETAILED DESCRIPTION

An exemplary capsule handling device 1 as well as its operation with a capsule, all in accordance with the invention, are illustrated in FIGS. 1 to 17b.

Such handling device 1 may be included in a beverage machine (not shown) having a capsule ingredient processing module that includes the handling device.

In the particular embodiment illustrated in the Figures, in particular in FIGS. 6a, 6b, 18 and 19, device 1 is arranged for handling selectively a first capsule 2a having a first flange 2a' and a second capsule 2b having a second flange 2b' greater than first flange 2a'. For instance, second flange 2b' has a dimension, e.g. diameter db, that is greater than a dimension, e.g. diameter da, of first flange 2a'. Optionally, second capsule 2b has a height hb that is greater than a height ha of first capsule 2a.

Capsule 2a,2b can be of the type described above under the header "field of the invention". Capsule 2a,2b may have a container-body or receptacle 2a",2b", e.g. a generally cup-shaped body, for holding the capsule content, such as a beverage ingredient. Capsule 2a,2b may have an axis of symmetry 2as,2bs, for example an axis of revolution. Capsule 2a,2b may have a face $2a^{IV},2b^{IV}$, e.g. forming a bottom of body or receptacle 2a",2b". At face $2a^{IV}, 2b^{IV}$ outflowing or inflowing liquid may be circulated, e.g. a carrier liquid such as water to be mixed with the content of capsule 2a,2b.

The storage space of capsule 2b may be greater than the storage space of capsule 2a. For instance, second capsule 2b may for instance have a shoulder portion $2b^{VI}$ that provides additional storage space for the content, e.g. ingredient.

Capsule 2a,2b may have a flange 2a',2b' at a rim of body or receptacle 2a",2b" confining a face $2a^V,2b^V$, e.g. a lid such as a sealing lid. At face $2a^V,2b^V$ outflowing or inflowing liquid may be circulated, e.g. a carrier liquid such as water to be mixed with the content of capsule $2a,2b$.

For example, a carrier liquid such as water flows into capsule $2a,2b$ at face $2a^{IV},2b^{IV}$ and liquid extract, e.g. a beverage formed by mixing the capsule content with the carrier liquid, flows out of claims $2a,2b$ at face $2a^V,2b^V$.

Suitable capsules are for example disclosed in EP 0 512 468, EP 0 512 470 and EP 2 068 684.

Figure 6A:
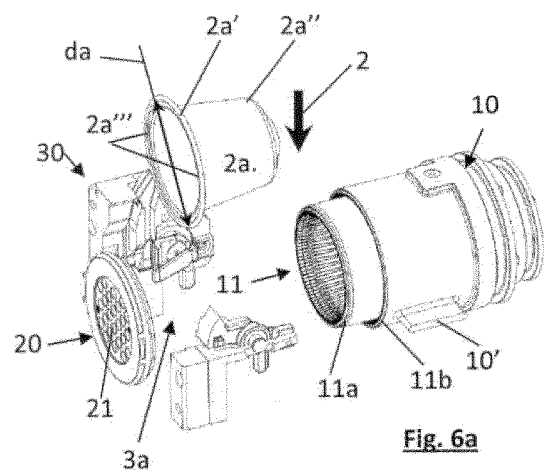
Figure 6B:
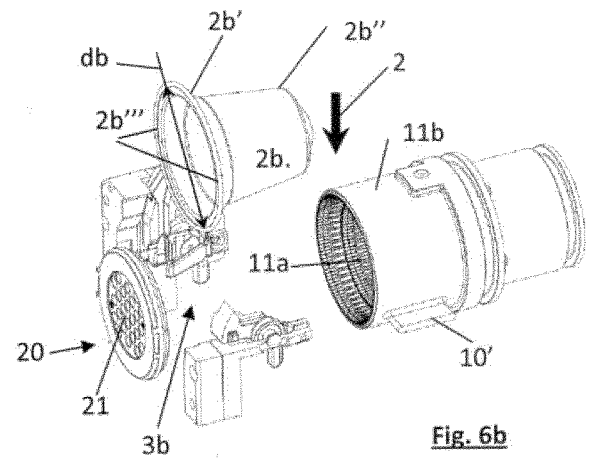

Capsule handling device 1 comprises a first part 10 and a second part 20 that are relatively movable from a transfer position for inserting and/or removing such capsule $2a,2b$ to an extraction position for extracting such capsule $2a,2b$. As illustrated in FIGS. 6a and 6b, capsule $2a,2b$ may be inserted from above device 1 along an insertion direction 2 into device 1. As illustrated in FIGS. 13a and 13b capsule $2a,2b$ may be removed from device 1 along a removable direction 2' below device 1. Capsule $2a,2b$ may be collected in a capsule collector below device 1, for example as disclosed in WO 2009/074559.

For instance, first and second parts 10,20 are relatively moved by an appropriate motorization, e.g. as disclosed in WO 2012/025258 and WO 2013/127476.

Figure 18:
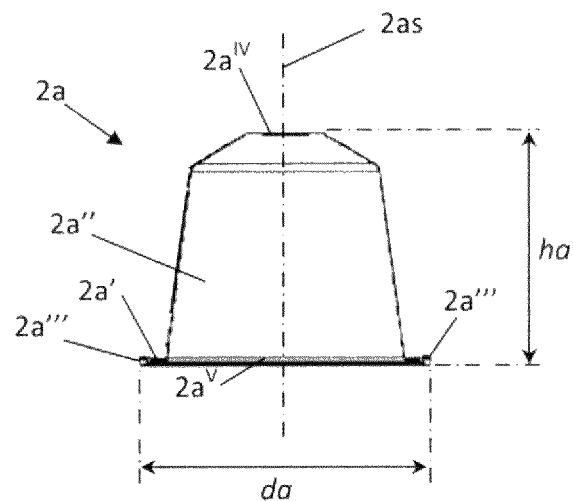
FIGS. 18 and 19 show capsules of two different types that can be used in the device of FIG. 1.
Figure 19:
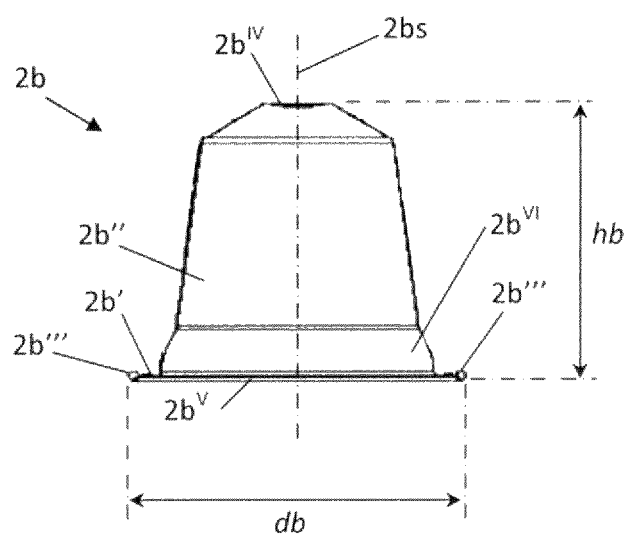

Device 1 can have an extraction chamber for holding and housing capsule $2a,2b$ that is formed by bringing first and second parts 10,20 into the extraction position. The extraction chamber may be configured for holding and housing a capsule $2a,2b$ containing a flavouring ingredient, such as tea or coffee or chocolate or powder milk. As mentioned above. When capsule $2a,2b$ is located in the extraction chamber, axis of symmetry $2as,2bs$ may generally be aligned with a corresponding axis of symmetry of the extraction chamber. To accommodate capsules of different sizes, e.g. as illustrated in FIGS. 18 and 19, the chamber may have variable dimensions fitting about the capsules and/or closure distances, as for example disclosed in PCT/EP13/070756 and PCT/EP13/070866.

The processing module that includes device 1 may be configured to circulate a liquid into the chamber, typically for mixing with the ingredient in particular for brewing the capsule's ingredient. For instance, one part 10 is configured for an injection of water into the chamber and another part 20 is a beverage dispensing part. For example, part 10 forms a cage for receiving capsule $2a,2b$ and part 20 includes a beverage delivery plate 21 associated with a beverage outlet (not shown). Optionally, delivery plate 21 is mounted in a frame 22. Delivery plate 21 may include one or more openings for the outflow of beverage and/or one or more elements for opening capsule $2a,2b$. Opening elements are not needed when capsule $2a,2b$ is pre-opened and/or includes a self-opening arrangement, e.g. an opening arrangement activated by a pressure increase in or on the capsule, e.g. a pressure increase resulting from an injection of water or another carrier liquid under pressure into the extraction chamber.

When closed capsules $2a,2b$ are used, first and second parts 10,20 may include a capsule opener such as blades and/or a tearing tool, e.g. a plate 21 with a tearing profile, for instance as known from Nespresso™ machines. See for example EP 0 512 468, EP 0 512 470, PCT/EP2013/073530, EP2013180164.9 and EP2013180166.4 and EP2013180165.6.

A flavoured beverage may be prepared by circulating a carrier liquid, such as water, into the ingredient chamber to flavour the liquid by exposure to the flavouring ingredient held in the extraction chamber.

An automatic capsule recognition system may be used to parameterize and adjust the processing of capsule $2a,2b$ automatically in line with the recognized capsule type. Capsules $2a,2b$ may differ as to the volume of their content and/or the conditions for extracting the content, e.g. temperature, pressure and/or flow characteristics.

A beverage machine including device 1 typically incorporates one or more of the following components:

a) The processing module, e.g. a fluid circuit including device 1, delimiting in the processing position the extraction chamber for receiving and housing ingredient capsule $2a,2b$ and for guiding via an inlet an incoming flow of liquid for flavouring thereof, such as water, through this ingredient to a beverage outlet;

b) an in-line heater and/or cooler for heating this flow of liquid to be supplied to ingredient capsule $2a,2b$ or a boiler and/or cooler reservoir for heating or cooling a batch of the liquid for the same purpose;

c) a pump for pumping liquid through or from the heater or cooler;

d) one or more fluid connecting members for guiding liquid from a source of liquid, such as tank of liquid; a fluid tube extending to the heater or cooler or the pump;

e) an electric control unit, in particular comprising a printed circuit board (PCB), for receiving instructions from a user via an input user-interface and/or capsule recognition system and for controlling the heater, cooler, pump and possibly handling device 1; and/or f) one or more sensors for sensing at least one characteristic selected from characteristics of the processing module, the heater and/or cooler, the pump, capsule $2a,2b$, a liquid tank, an ingredient collector, a flow of the liquid (e.g. by a flowmeter), a pressure of the liquid and a temperature of the liquid, and for communicating such characteristic(s) to the control unit.

For instance, the processing module includes or is connected to an upstream fluid arrangement, e.g. incorporating a liquid driver, such as a pump, and a thermal conditioner, such as a heater, for circulating thermally conditioned liquid, such as water, from a source, e.g. a liquid reservoir, into the ingredient processing chamber. Examples of upstream fluid arrangements are disclosed in WO 2009/074550 and in WO 2009/130099. The heater may be a thermoblock or an on demand heater (ODH), for instance an ODH type disclosed in EP 1 253 844, EP 1 380 243 and EP 1 809 151.

Examples of suitable fluid circuits of processing modules are for instance disclosed in WO 2009/074550 and WO 2009/130099, which are hereby incorporated by way of reference. Control unit configurations and connections are for example disclosed in WO 2009/043851 and WO 2009/043865.

Moreover, the processing module typically includes a downstream fluid arrangement collecting the prepared beverage and leading into an outlet for dispensing beverage to a user, e.g. to an area for placing a user-cup or a user-mug, the beverage formed in the extraction chamber containing the ingredient mixed with the circulating liquid. The dispensing area may be delimited at the bottom by a support surface for holding a user cup or mug. Such support surfaces are well known in the art, e.g. as disclosed in EP 1 867 260 and WO 2009/074557.

Figures 2, 2A, 2B:
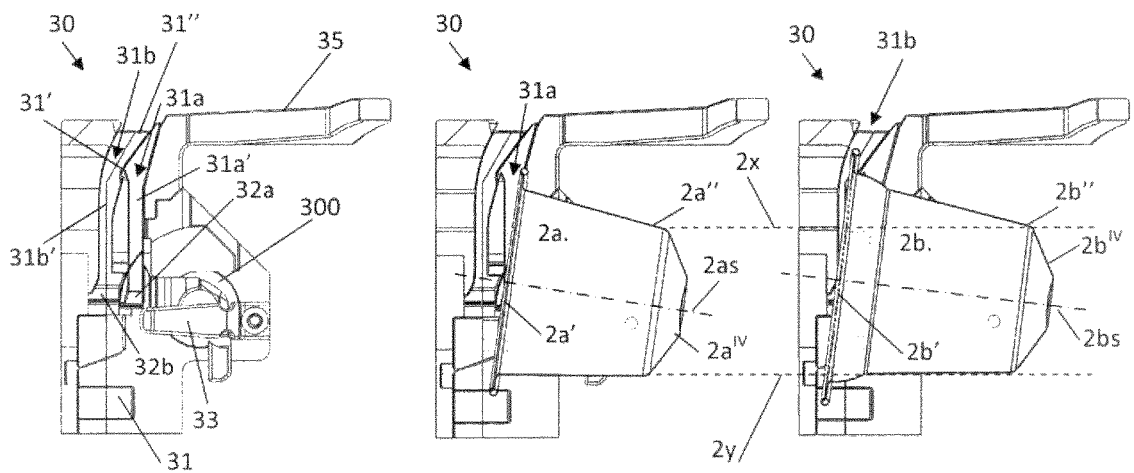
FIG. 2 is a side view of a part of the device shown in FIG. 1, FIGS. 2a and 2b illustrating the use of capsules of different sizes in the device.

As illustrated in FIGS. 2, 2a and 2b, device 1 can have a third part 30 for guiding such capsule $2a,2b$ to inbetween first and second parts 10,20 when in the transfer position. Third part 30 typically delimits a capsule passage or chimney.

For guiding capsule $2a,2b$ to inbetween first and second parts 10,20 in their transfer position, third part can have: a first portion 31a for engaging with and guiding first flange 2a' of first capsule 2a; and a second portion 31b for engaging with and guiding second flange 2b' of second capsule 2b. For instance, third part 30 is so configured that: first portion 31a is bypassed by second flange 2b' when second capsule 2b is guided to inbetween the first and second parts 10,20 in the transfer position; and second portion 31b is bypassed by first flange 2a' when first capsule 2a is guided to inbetween the first and second parts 10,20 in the transfer position.

First portion 31a can have a first flange engagement and guiding arrangement 31a' dimensioned for first flange 2a'. Second portion 31b may have a second flange engagement and guiding arrangement 31b' dimensioned for second flange 2b'. Optionally, second arrangement 31b' is larger than first arrangement 31a'.

As illustrated in FIGS. 2, 2a, 2b, 6a, 6b and 13x first portion 31a may have a first flange engagement and guiding arrangement 31a' comprising facing rails or grooves for engaging with generally opposite and corresponding matching edges 2a''' of first flange 2a'. Second portion 31b can have a second flange engagement and guiding arrangement 31b' comprising facing rails or grooves for engaging with generally opposite and corresponding matching edges 2b''' of second flange 2b'.

For instance, such facing rails or grooves 31a' of first portion 31a are spaced apart by a first spacing distance Da adjusted to the first flange 2a' and facing rails or grooves 31b' of second portion 31b are spaced apart by a second spacing distance Db adjusted to second flange 2b'. First and second spacing distances are indicated by arrows Da,Db that show the direction of measuring the spacing between facing grooves or rails, of which only the grooves or rails of one side of part 30 is partly shown in the perspective view of FIG. 13x. Second spacing distance Db can be greater than first spacing distance Da. First spacing distance Da can be smaller than a dimension db of second flange 2b', typically a diameter db of flange 2b', extending between facing rails or grooves 31b' of second portion 31b when second flange 2b' is guided by facing rails or grooves 31b' of second portion. Hence, when spacing distance Da of facing rails or grooves 31a' of first portion 31a is smaller than diameter db of second flange 2b', second flange 2b' is geometrically prevented from engaging facing rails or grooves 31a' of first portion 31a and can be guided to facing rails or grooves 31b' of second portion 31b. Such a configuration is illustrated in FIG. 13x in combination with FIGS. 6a and 6b.

Third part 30 can have a branching portion 31', such as a wedge arrangement, for directing first flange 2a' to the first portion 31a and second flange 2b' to second portion 31b.

Third part 30 can have a common portion 31'' for engaging with any of first and second flanges 2a',2b' and for guiding such flanges either to first portion 31a or second portion 31b (FIGS. 2, 2a and 2b).

Figure 1:
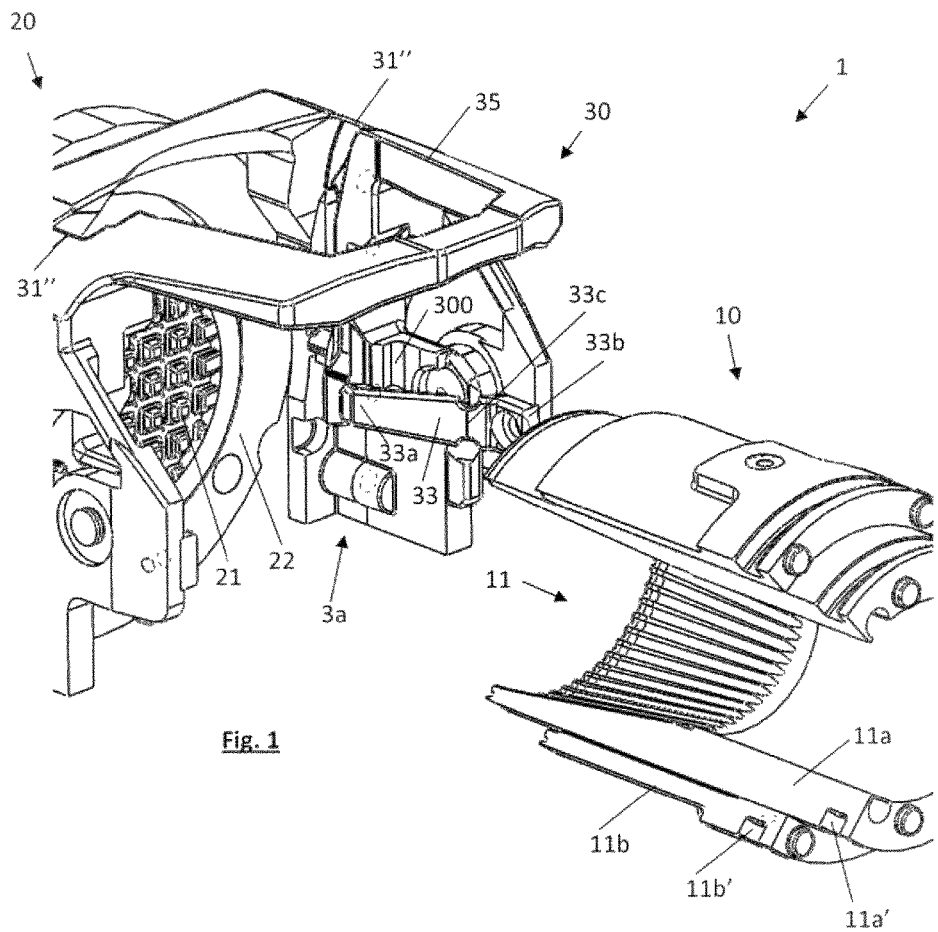
FIG. 1 is a perspective view of part of a handling device in accordance with an embodiment of the invention.

Third part 30 may have a window 35 for allowing capsules 2a,2b into third part 30. For instance, window 35 has a shape that generally corresponds to an outermost boundary of superimposed transverse cross-sections of first and second capsules 2a,2b, such as a generally bell-shaped window 35 (FIG. 1).

Window 35 may be associated with a capsule positioner (not shown) that receives capsules 2a,2b to then supply it through window 35, for example as disclosed in PCT/EP13/064003 and PCT/EP13/064001. For instance, the positioner is located above window 35. The capsule positioner can be located above or on top of the capsule guiding part 30, e.g. above a capsule passage or chimney, so that capsule 2a,2b can be driven by gravity from the capsule positioner to inbetween parts 10,20.

Window 35 or a capsule positioner located thereon, may be associated with a capsule variety detector and/or capsule size detector, for example as disclosed in WO 2012/123440. The beverage machine may comprise a capsule-length detector. The capsule detector can be adapted to detect the presence of a capsule 2a,2b to be positioned inbetween parts 10,20 for instance when positioned on a positioner and to identify whether the detected capsule is of a first type 2a or of a second type 2b different to the first type 2a. More particularly, the capsule-length detector may be configured to determine the type of the capsule according to the length of the capsule. For example, the capsule-length detector may be configured to detect the presence of a metallic capsule in the positioner, and then, determine if the detected capsule is of the first type or the second type by checking if the maximum length of the capsule along its axis of symmetry 2as,2bs is sensibly equal to a first length ha or to a second length hb corresponding respectively to the first capsule type 2a and second capsule type 2b. Such a detection is for example disclosed in greater details in co-pending application EP 2012187762.5.

Third part 30 can include stop means 32a,32b for stopping capsule 2a,2b inbetween first and second parts 10,20 so that when first and second parts 10,20 are moved from the transfer position to the extraction position capsule 2a,2b can be taken over and secured by the first and second parts 10,20 for extraction. For instance, the stop means comprise at least one member 32a,32b for stopping first capsule flange 2a' after engagement in first portion 31a and/or for stopping second capsule flange 2b' after engagement in the second portion 31b. For example, as illustrated in the appended figures, the stop means comprise:

at least one pair of facing members 32a,32b for stopping thereinbetween first capsule flange 2a' or second capsule flange 2b' (FIGS. 2 and 13x); and/or at least a first member 32a for stopping first capsule flange 2a' and at least one second member 32b for stopping second capsule flange 2b'; and/or a pair of facing first members 32a for stopping therebetween first capsule flange 2a' and a pair of facing second members 32b for stopping therebetween said second capsule flange 2b'; optionally facing first members 32a being spaced apart by a distance that is smaller than the spacing distance of facing second members 32a and/or the facing first members 32a being spaced apart by a distance that is smaller than dimension da of first flange 2a' and facing second members 32b being spaced apart by a distance that is smaller than dimension db of the second flange 2b'.

Figure 9A:
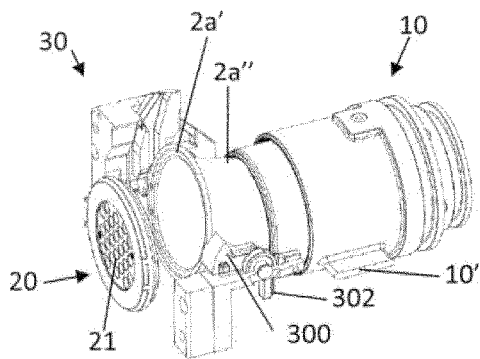
Figure 9B:
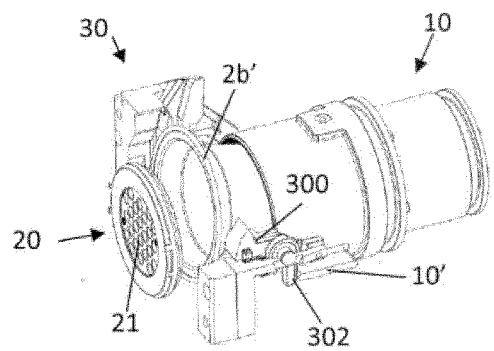

When handling device 1 is configured to handle capsules 2a,2b that tilt inbetween first and second parts 10,20, e.g. capsules 2a,2b having tilted axis of symmetry 2as,2bs, as for example illustrated in FIGS. 2 to 2b, and when first capsule 2a has a height ha that is shorter than height hb of second capsule 2b (FIGS. 18 and 19), first member(s) 32a may for example be located at a level below second member(s) 32b (FIG. 2) so that ends, e.g. faces $2a^{IV}, 2b^{IV}$, of capsules 2a,2b opposite members 32a,32b are located at about the same level, as indicated by dashed lines 2x,2y in FIGS. 2a and 2b. Thereby, ends $2a^{IV}, 2b^{IV}$ can be taken over at about the same level (height) by relatively moving parts 10,20 when moved towards the extraction position, as illustrated in FIGS. 9a and 9b. However, such a configuration results from the particular dimensions of capsules 2a,2b and the configuration and path of movement of parts 10,20 as well as the particular configuration of part 30. Other equivalent configurations are equally possible without departing from the inventive idea, e.g. a relative movement of parts 10,20 along a generally identical orientation 2as,2bs of capsules 2a,2b in their position inbetween parts 10,20.

First portion 31a may include a first flange section 300 (FIG. 3) that is movable between a first position (FIGS. 1, 4, 6a to 10a, 13a and 13b) for engaging with first flange 2a' and a second position (FIGS. 5, 10b to 12b) for freeing a passage for second capsule 2b and/or for at least one of the first and second parts 10,20 in a configuration for receiving second capsule 2b.

Hence, flange section 300 can be implemented in a device 1 that can handle several types of capsules, e.g. the above-mentioned first and second capsules 2a,2b or even more capsule types, or only one type of capsules, e.g. to allow the passage of one of the first and second parts when such part would otherwise interfere with flange section 300 if the latter remained in its first position at the passage of the first or second part.

It follows that in an embodiment, device 1 for handling a capsule 2a,2b that has a flange 2a',2b' (i.e. device 1 is configured for handling a single capsule type or, as discussed above, a plurality of capsule types 2a,2b having different flange sizes 2a',2b'), comprises: a first part 10 and a second part 20 that are relatively movable across a space 3a,3b from a transfer position for inserting and/or removing such capsule 2a,2b to an extraction position for extracting such capsule; a third part 30 for guiding such capsule 2a,2b to inbetween first and second parts 10,20 when in the transfer position. Optionally third part 30 is fixed to first part 10 or to second part 20. Third part 30 is for example integral with or assembled to part 10,20 it is fixed to. Device 1 further comprises stop means 32a,32b for successively: stopping capsule 2a,2b inbetween first and second parts 10,20 in the transfer position; maintaining capsule 2a,2b while first and second parts 10,20 are relatively moved from the transfer position towards the extraction position to receive said capsule; and allowing a liberation of capsule 2a,2b from stop means 32a,32b after reception of capsule 2a,2b by at least one of first and second parts 10,20 while relatively moving towards the extraction position. Third part 30 has a flange section 300 that has a first position for engaging with and guiding capsule flange 2a',2b' when first and second parts 10,20 are in the transfer position before liberation of such capsule 2a,2b from stop means 32a,32b. Flange section 300 in the first position can extend into space 3a,3b, the flange section 300 being moved after capsule liberation from its first position to a second position in which flange section 300 is retracted from space 3a,3b to allow a crossing thereof by at least one of the first and second parts 10,20.

Figure 3:
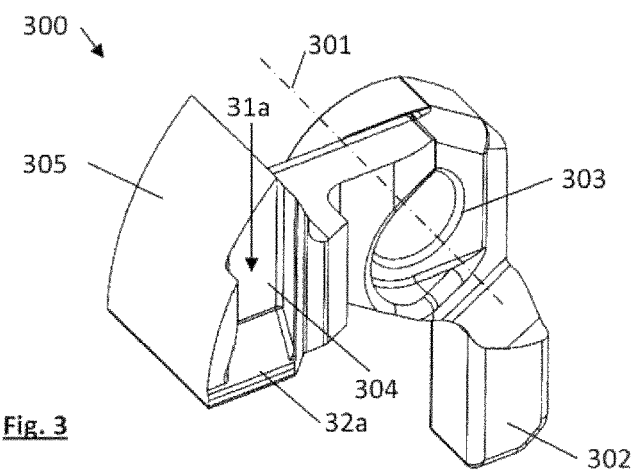
FIG. 3 is a perspective view of a movable flange section of the device shown in FIG. 1.

Flange section 300 typically has a member 304 bearing a stop means 32a and at least part of a portion 31a for engaging with and guiding flange 2a' (FIG. 3).

Flange section 300 can be: pivotable or translatable between its first and second positions, flange section 300 being optionally:

pivotable about an axis 301 that is generally orthogonal or at an angle to a movement direction of the relatively movable first and second parts 10,20 (FIG. 3); and/or
provided with at least one plain bearing surface 303,305 for a guidance of the flange section between its first and second position, optionally flange section 300 being provided with two parallel or concentric bearing surfaces 303,305; and/or
part of a portion 31a,31b for engaging with and guiding flange 2a',2b' of capsule 2a,2b, portion 31a,31b having a flange engagement and guiding arrangement 31a', 31b' comprising facing rails or grooves for engaging with generally opposite and corresponding matching edges 2a''',2b''' of flanges 2a',2b'.

Figure 4:
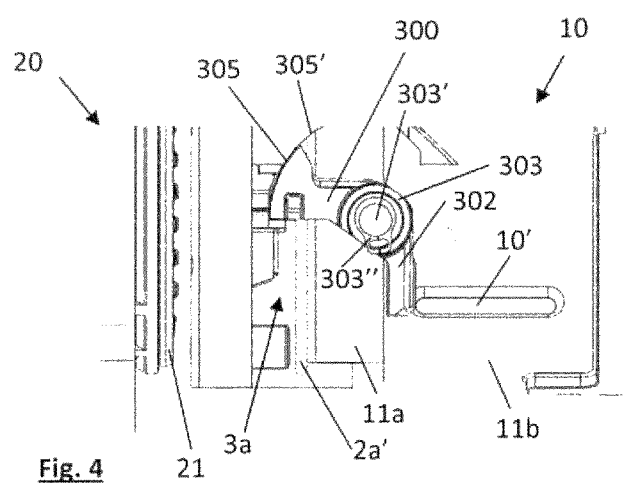
FIGS. 4 and 5 are side views of this movable flange section in operation in the device.
Figure 5:
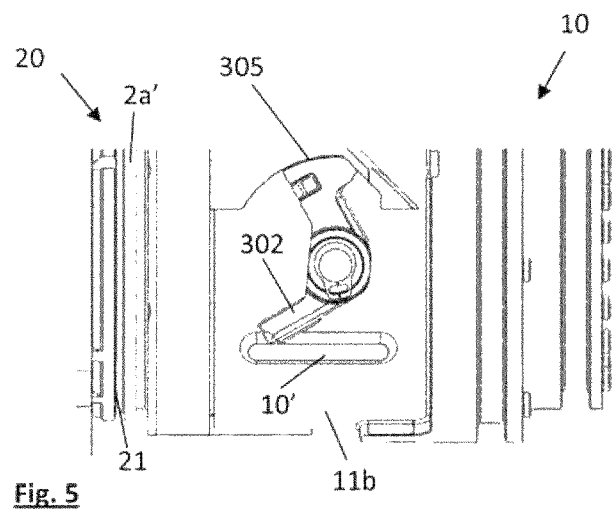

Bearing surface 303 of section 300 may be mounted on a pin 303', optionally secured by a clip 303" thereon. Such pin 303' may protrude from third part 30 (FIG. 4). Bearing surface 305 may slide against a corresponding bearing surface 305' of part 30 to assist proper guidance of flange section 300 between its first and second positions.

At least one of first and second parts 10,20 may comprise an actuator 10' for actuating flange section 300 between its first and second positions, flange section 300 having optionally a dive arm 302 that is actuated by actuator 10'. At least one of first and second parts 10,20 can be arranged to take selectively a first configuration for receiving a first capsule 2a and a second configuration for receiving a second capsule 2b larger than first capsule, optionally a first capsule 2a having a first flange 2a' and a second capsule 2b having a second flange 2b' greater than first flange 2a'. At least one of first and second parts 10,20 arranged to take selectively the first and second configurations comprises such actuator 10' that is moved between its first and second positions by changing the configuration of said at least one of the first and the second parts 10,20.

Section 300 may be actuated by the relatively moving parts 10,20 from its first into its second position and returned into the first position under the effect of gravity or a magnet or a return spring or a similar device. Alternatively, the section may be actuated by the relatively moving parts from its first into its second position and returned into the first position under the effect of gravity or a magnet or a return spring or a similar device.

First and second parts 10,20 in their first configuration can be relatively movable across a first space 3a. First and second parts 10 in their second configuration can be relatively movable across a second space 3b that is larger than first space 3a. Flange section 300 in its first position may extend into second space 3b and may be moved into its second position when first and second parts 10,20 in their second configuration are moved to the extraction position. Flange section 300 in its first position can: extend into first space 3a and be moved into its second position when first and second parts 10,20 in their first configuration are moved to the extraction position; or remain outside first space 3a and remaining in the first position while first and second parts 10,20 in their first configuration are moved from the transfer position to the extraction position.

Section 300 may extend into both first and second spaces 3a,3b. In this case, section 300 can be moved from the first into the second position when first and second parts 10,20 are moved into the extraction position irrespectively of whether first and second parts 10,20 are in their first or second configurations. For example, as illustrated in FIGS. 10b and 11b, section 300 is moved into its second position with both configurations of first and second parts 10,20.

In a non-illustrated embodiment, second portion may comprise a second flange section that is movable between a first position for engaging with the second flange and a second position for freeing a passage for the first capsule and/or for at least one of the first and second parts e.g. in a configuration for receiving the first capsule.

The first and/or second portions may include movable sections 300 to give way to an object, the movement of which would otherwise interfere with the movable section in the first position. Typically, the object can be at least one of capsule 2b, first part 10 and the second part; such capsule 2b or first or second part being larger than spacing Da between movable sections 300 in their first position; such first and/or second part being larger than the spacing between the movable sections, the first and or second parts being for example structurally reinforced and/or expanded to receive a larger capsule (second capsule).

At least one of first and second parts 10,20 may include an actuator 10' for actuating flange section 300, e.g. by acting on drive arm 302 of flange section 300.

At least one of first and second parts 10,20 can be arranged to take selectively a first configuration for receiving first capsule 2a and a second configuration for receiving second capsule 2b. For instance, first and/or second parts 10,20 has a first receiver part 11a and a second receiver part 11b that are relatively moveable between a first position for forming a cavity 11 that is small for receiving first capsule 2a and a second position for forming cavity 11 that is larger for receiving second capsule 2b, for instance to receive capsule receptacle 2a",2b". For instance, first receiver part 11a is in the general shape of a cup for receiving capsule receptacle 2a" and second receiver part 11b is in the general shape of a ring outside or inside first receiver part 11a. In the embodiment illustrated in FIGS. 1, 6a and 6b, first part 10 has a first receiver part 11a for receiving first capsule 2a and a second receiver part 11b for receiving second capsule. In FIGS. 1 and 6a, second receiver part 11b is shown in its withdrawn position so that first capsule 2a can be received in cavity 11 in its small configuration. In FIG. 6b, second receiver part 11b is shown in its extended position so that second capsule 2b can be received in in cavity 11 in its large configuration. Receiver part(s) 11a,11b may be provided with a sealing arrangement, for instance a groove or other surface cooperating with a seal, e.g. an O-ring, to seal off receiver part(s) 11a,11b when held in a holder (not shown) of such receiver parts. Examples of first or second parts 10,20 that can take different configurations depending on the size of the capsule to be handled are disclosed in PCT/EP13/070866 and in PCT/EP13/070756. Configuring parts 10,20 can be achieved by an appropriate motorization thereof or manually.

At least one of first and second parts 10,20 arranged to take selectively said first and second configurations can comprise actuator 10' that is moved between its first and second positions by changing the configuration of the at least one of the first and the second parts 10,20.

FIGS. 6a to 13b illustrate a loading and unloading sequence of capsules 2a,2b with a particular emphasis of flange section 300.

In FIG. 6a, part 10 is configured to receive first capsule 2a, second receiver part 11b being in a rest position behind the mouth of first receiver part 11a so that cavity 11 is in a short configuration for capsule 2a having smaller height ha. In FIG. 6b, part 10 is configured to receive second capsule 2b, second receiver part 11b being in an operative position extending in front of the mouth of receiver part 11b so as that cavity 11 is in a long configuration for receiving second capsules 2b having a greater height hb. Furthermore, in FIGS. 6a and 6b, a capsule of a first type 2a and of a second type 6b, respectively, are dropped into third part 30 under the effect of gravity along direction 2.

Figure 7A:
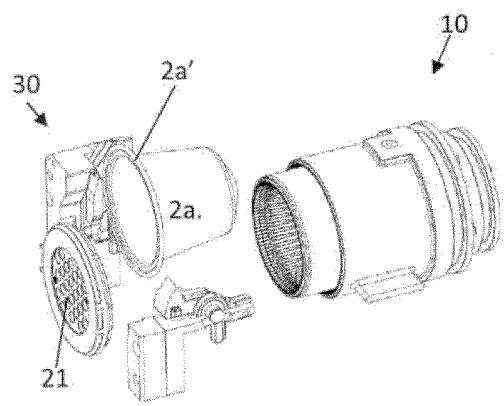
Figure 7B:
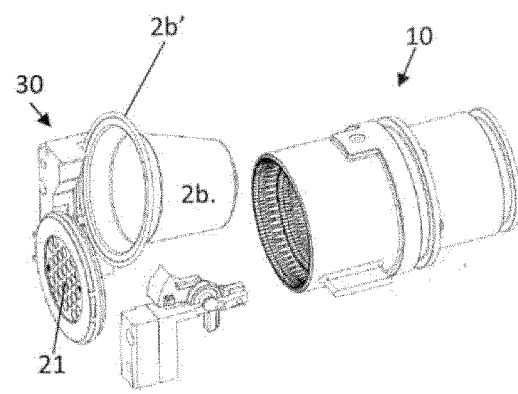

In FIGS. 7a and 7b, capsule flanges 2a',2b' of capsules 2a,2b are guided by third part 30. For example, capsules 2a,2b slide along separate paths formed by first portion 31a for guiding capsule flange 2a' of first capsule 2a and second portion 31b for guiding capsule flange 2b' of second capsule 2b, first portion 31a being bypassed by second flange 2b' and second portion 31b being bypassed by first flange 2a'.

Figure 8A:
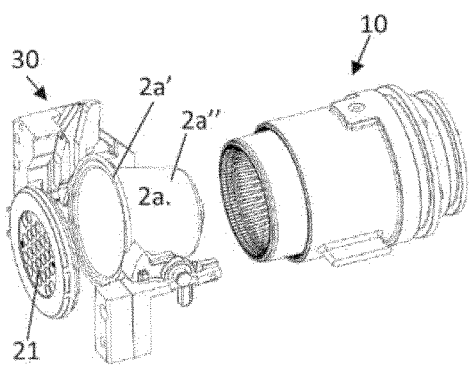
Figure 8B:
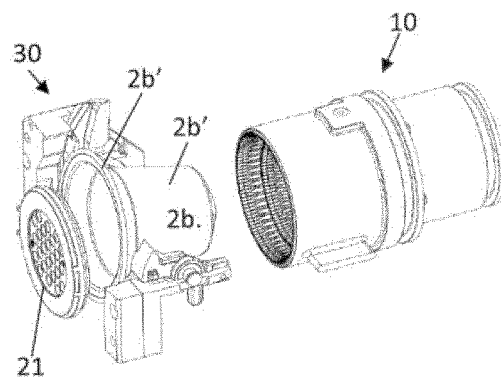

In FIGS. 8a and 8b capsules 2a,2b are shown inbetween parts 10,20 in their transfer position, whereby capsule flange 2a' rests on stop member(s) 32a and capsule flange 2b' rests on stop member(s) 32b. Capsules 2a,2b are illustrated in a slightly inclined orientation when resting on stop members 32a,32b. See FIGS. 2a and 2b for the capsule inclination.

In FIGS. 9a and 9b, parts 10,20 are relatively moved from their transfer position towards the extraction position, faces $2a^{IV},2b^{IV}$, e.g. capsule ends $2a^{IV},2b^{IV}$, having entered cavity 11 delimited by part 10.

Figure 10A:
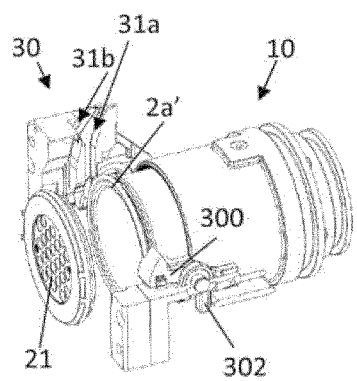
Figure 10B:
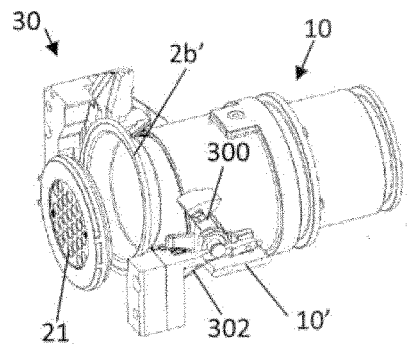

In FIG. 10a, part 10 in the relative motion of parts 10,20 has urged capsule 2a down under stop member(s) 32a, thereby liberating capsule 2a from stop member(s) 32a. In FIG. 10b capsule 2b still rests on stop member(s) 32b, actuator 10' acting on flange section 300, e.g. on arm 302 thereof, to move it from its first position into its second position and allow the passage of part 10 next to section 300.

Figure 11A:
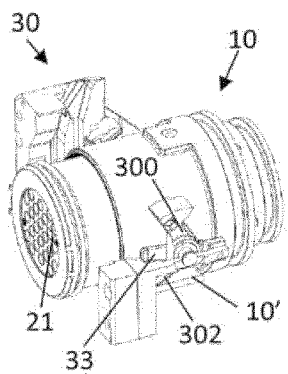
Figure 11B:
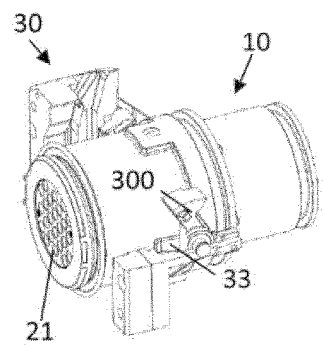

In FIGS. 11a and 11b parts 10,20 are in their extraction position, flanges 2a',2b' being for example pinched for sealing between the second part 10, e.g. extraction plate 21 and/or frame 22, and the mouth of receiver parts 11a and 11b, respectively. In this case, flange 2b' has passed underneath stop member(s) 32b whereby capsule 2b is liberated from stop member(s) 32b. In FIGS. 11a and 11b, flange section 300 are in their second position so as to avoid interference with the passage of part 10.

In FIGS. 12a and 12b, parts 10,20 are relatively moved from their extraction position towards their transfer position, capsule 2a,2b being withdrawn from extraction plate 21. As explained in grater details below, separators 33 act against flange 2a',2b' to separate capsule 2a,2b from part 10 while parts 10,20 are moved towards their transfer position.

In FIGS. 13a and 13b, parts 10,20 are in their transfer position. Capsule 2a,2b has been allowed to drop under the effect of gravity along direction 2' under stop members 32a,32b. Flange section 300 is no more maintained by actuator 10' into the second position and has been allowed to return into its first position. Device 1 is ready to handle a new capsule 2a,2b.

The third part 30 can be fixed to first part 10 or to second part 20. Optionally, third part 30 is integral with or assembled to the part 10,20 it is fixed to. For example, third part 30 is fixed to frame 22 of second part 20 as illustrated in FIGS. 14a to 17b.

As illustrated in FIGS. 1, 13a, 13b, 13x and 14a to 17b, device 1 may include separation means 33 for separating capsule 2a,2b from at least one of first and second parts 10,20, such as from a cavity 11 in at least one of first and second parts 10,20, when first and second parts 10,20 are relatively moved from the extraction position to the transfer position. For instance, separation means 33 are movable relative to at least one of first and second parts 10,20, separation means 33 being for example fixed to third part 30. Separation means 33 can be configured to act against either of first and second flanges 2a,2b. Separation means 33 can be movable to adapt spatially to either of first and second flanges 2a,2b. Separation means 33 may have an engaging portion 33a that is movable into a position for engaging with first flange 2a (FIG. 16a) and into a position for engaging with second flange 2b (FIG. 16b). Separation means 33 can also be moved into other positions, for example into a rest position (FIGS. 1 and 2) or into a position in which it is bypassed by relatively moving parts 10,20 (FIGS. 11a, 11b, 15a and 15b). Separation means 33 can be resiliently movable for acting against first and second flanges 2a',2b' and positionable by first and second capsules 2a,2b, optionally by first and second capsule receptacles 2a",2b" of first and second capsules 2a,2b, to engage with first and second flanges 2a',2b' (FIGS. 16a and 16b).

For instance, separation means 33 may comprise a separator body 33a having an extremity that is configured to act against either of first and second flanges 2a,2b.

In an embodiment, the separation means has a separator 33 that has a capsule engaging portion 33a and an anchorage portion 33b for mounting separator 33 in such device 1. Engaging portion 33a may be articulated on anchorage portion 33b, for instance about a hinge 33c (FIG. 1). Anchorage portion 33b may be fixed to device 1, e.g. to third part 30, in any appropriate manner, for instance assembled by one or more means selected from screws, rivets, glue and welding, or it may be integrally formed with third part 30 or another part of device 1. See for example FIGS. 1 and 13x. The engaging portion forms optionally a ram 33a for acting, e.g. pushing, against capsule 2a,2b, in particular against capsule flange 2a',2b', for separating such capsule from at least one of first and second parts 10,20, in particular from a cavity 11 in such part 10,20. See for example FIGS. 16a and 16b.

As illustrated, device 1 may include a pair of such separators 33, for example to act on opposite edges 2a''',2b''' of flange 2a',2b'. At least one of first and second parts 10,20 can be located between separators 33 when in the extraction position and/or such capsule 2a,2b can be located between separators 33 when in the extraction position. When first or second part 10,20 is located between separators 33, the separators may be in a third position for allowing passage of part 10,20.

At least one of first and second parts 10,20 can have a cavity 11 for receiving a capsule receptacle 2a'',2b'' of such capsule 2a,2b. Separation means 33 may be movable relatively to cavity 11 so that capsule flange 2a',2b' of such capsule 2a,2b is intercepted by separation means 33 moving relatively to cavity 11 when first and second parts 10,20 are relatively moved from the extraction position to the transfer position so as to withdraw capsule receptacle 2a'',2b'' from cavity 11.

FIGS. 14a to 17b illustrate an unloading sequence of capsules 2a,2b with a particular emphasis on separator 33 acting on flanges 2a',2b' to remove capsule 2a,2b from device 1.

Figure 14A:
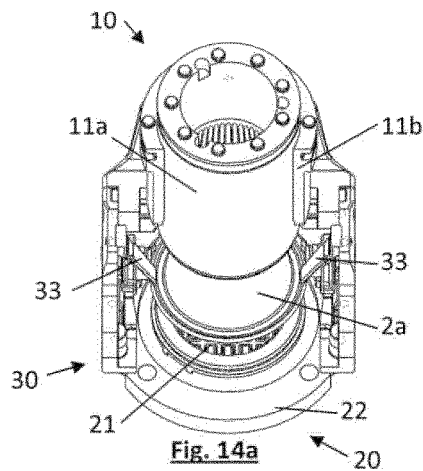
Figure 14B:
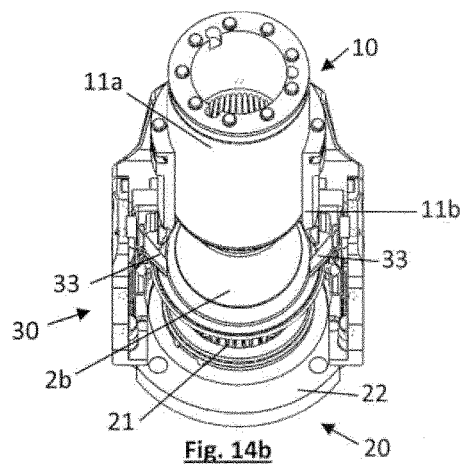

In FIG. 14a, part 10 is configured to receive first capsule 2a, receiver part 11b (partly cut away to reveal receiver part 11a) being in a rest position behind the mouth of receiver part 11a so that cavity 11 within receiver part 11a is in a short configuration. In FIG. 14b, part 10 is configured to receive second capsule 2b, receiver part 11b (partly cut away to reveal receiver part 11a) being in an operative position extending in front of the mouth of receiver part 11b so as that cavity 11 is in a long configuration. Part 10,20 are in their transfer position and capsules 2a,2b are located inbetween parts 10,20.

Figure 15A:
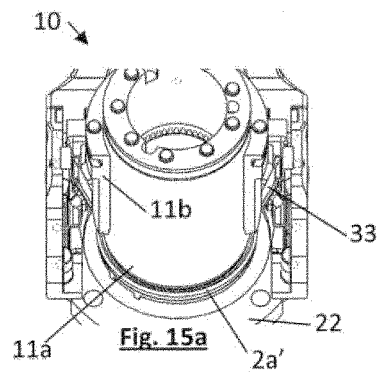
Figure 15B:
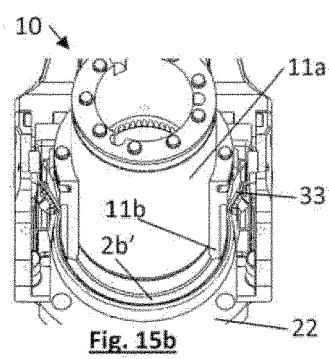

In FIGS. 15a and 15b, parts 10,20 have been relatively moved into their extraction position whereby capsules 2a,2b have been liberated under stop means 32a,32b and are housed in the extraction chamber while flanges 2a',2b' are pinched inbetween first and second parts 10,20. In FIG. 15a, flange 2a' is pinched between the mouth of receiver part 11a and part 20, for example extraction plate 21 and/or frame 22. In FIG. 15b, flange 2b' is pinched between the mouth of receiver part 11b and part 20, for example extraction plate 21 and/or frame 22.

Figure 16A:
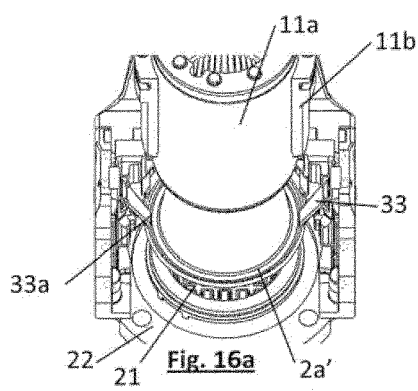
Figure 16B:
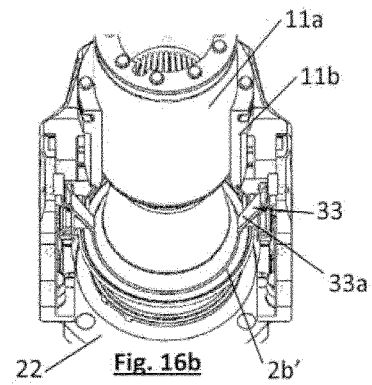

In FIGS. 16a and 16b, parts 10,20 are moved apart from their extraction position towards their transfer position, flange 2a',2b' being held back by separator 33 so as to separate capsule 2a, e.g. capsule receptacle 2a'',2b'' from part 10, such as from cavity 11. In the illustrated embodiment, an extremity 33a of separator 33 acts against flange 2a'.2b'.

Figure 17A:
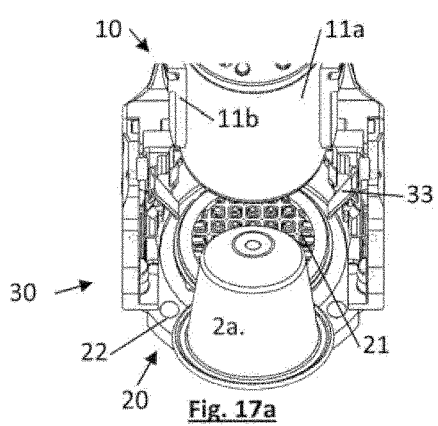
Figure 17B:
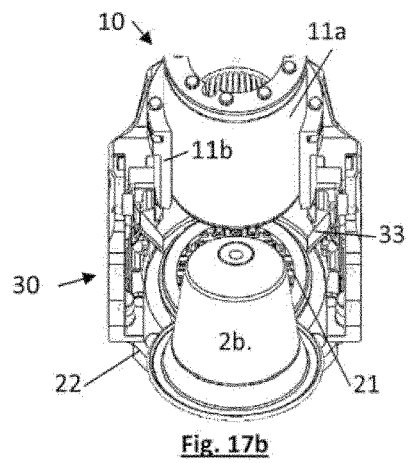

In FIGS. 17a and 17b, parts 10,20 are in their transfer position and capsules 2a,2b are allowed to drop under the effect of gravity.

The invention claimed is:

1. A device for handling selectively a first capsule having a first flange and a second capsule having a second flange having a dimension that is greater than a dimension of said first flange, the device comprising a first part and a second part that are relatively movable from a transfer position for inserting and/or removing such capsule to an extraction position for extracting such capsule, the device comprising: a separation member for separating the capsule from at least one of the first and second parts, in the at least one of the first and second parts, when the first and second parts are relatively moved from the extraction position to the transfer position, the separation member configured to be moved to adapt spatially to the first flange and the second flange, the separation member comprising an engaging portion that is movable to a first position for engaging with the first flange and movable to a second position for engaging with the second flange.

2. The device of claim 1, wherein the separation member comprises a separator body which is configured to act against either of the first and second flanges.

3. The device of claim 1, wherein the dimension of the second flange is a second flange diameter and the dimension of the first flange is a first flange diameter.

4. The device of claim 1, wherein the separation member is resiliently movable for acting against the first and second flanges and positionable by the first and second capsules, to engage with the first and second flanges.

5. The device of claim 1, wherein the separation member comprises a separator that has a capsule engaging portion and an anchorage portion for mounting the separator in such device.

6. The device of claim 1, wherein the separation member comprises a pair of separators, at least one of the first and second parts being located between the separators when in the extraction position and/or such capsule being located between the separators when in the extraction position.

7. The device of claim 1, wherein at least one of the first and second parts has a cavity for receiving a capsule receptacle of such capsule, the separation member being movable relatively to the cavity so that a capsule flange of such capsule is intercepted by the separation member moving relatively to the cavity when the first and second parts are relatively moved from the extraction position to the transfer position to separate the capsule receptacle from the cavity.

8. The device of claim 1, comprising a third part for guiding the capsule to inbetween the first and second parts.

9. The device of claim 8, wherein the third part comprises a stop member for stopping the capsule inbetween the first and second parts so that when the first and second parts are moved from the transfer position to the extraction position said capsule is taken over by the first and second parts for extraction.

10. The device of claim 1, wherein at least one of the first and second parts is arranged to take selectively a first configuration for receiving the first capsule and a second configuration for receiving said second capsule.

11. The device of claim 10, wherein the at least one of the first and second parts arranged to take selectively the first and second configurations comprises an actuator that is moved between first and second positions thereof by changing the configuration of the at least one of the first and second parts.

12. A device for handling selectively a first capsule having a first flange and a second capsule having a second flange greater than said first flange, the device comprising a first part and a second part that are relatively movable from a transfer position for inserting and/or removing such capsule to an extraction position for extracting such capsule,
the device comprising: a separation member for separating the capsule from at least one of the first and second parts, in the at least one of the first and second parts, when the first and second parts are relatively moved from the extraction position to the transfer position, and
a third part for guiding the capsule to inbetween the first and second parts, wherein the third part has:
a first portion for engaging with and guiding the first flange of the first capsule; and
a second portion for engaging with and guiding the second flange of the second capsule,
for guiding the capsule to inbetween the first and second parts in the transfer position,
the third part being so configured that:
the first portion is bypassed by the second flange when the second capsule is guided to inbetween the first and second parts in the transfer position; and
the second portion is bypassed by the first flange when the first capsule is guided to inbetween the first and second parts in the transfer position.

13. The device of claim 12, wherein the first portion has a first flange engagement and guiding arrangement dimensioned for the first flange and wherein the second portion has a second flange engagement and guiding arrangement dimensioned for the second flange.

14. The device of claim 12, wherein the first portion has a first flange engagement and guiding arrangement comprising facing rails or grooves for engaging with generally opposite and corresponding matching edges of the first flange and/or wherein the second portion has a second flange engagement and guiding arrangement comprising facing rails or grooves for engaging with generally opposite and corresponding matching edges of the second flange.

15. The device of claim 12, wherein the first portion comprises a first flange section that is movable between a first position for engaging with said first flange and a second position for freeing a passage for the second capsule and/or for at least one of the first and second parts.

16. The device of claim 15, wherein at least one of the first and second parts comprises an actuator for actuating the flange section.

17. A device for handling selectively a first capsule having a first flange and a second capsule having a second flange greater than said first flange, the device comprising a first part and a second part that are relatively movable from a transfer position for inserting and/or removing such capsule to an extraction position for extracting such capsule,
the device comprising: a separation member for separating the capsule from at least one of the first and second parts, in the at least one of the first and second parts, when the first and second parts are relatively moved from the extraction position to the transfer position, and
a third part for guiding the capsule to inbetween the first and second parts, wherein the third part comprises a stop member for stopping the capsule inbetween the first and second parts so that when the first and second parts are moved from the transfer position to the extraction position said capsule is taken over by the first and second parts for extraction, wherein the stop member comprises at least one member for stopping the first capsule flange after engagement in the first portion and/or for stopping the second capsule flange after engagement in the second portion.

18. A system comprising a first and second capsule and a device for handling selectively the first capsule having a first flange and a second capsule having a second flange having a dimension that is greater than a dimension of said first flange, the device comprising a first part and a second part that are relatively movable from a transfer position for inserting and/or removing such capsule to an extraction position for extracting such capsule, and
the device comprising: a separation member for separating the capsule from at least one of the first and second parts, in the at least one of the first and second parts, when the first and second parts are relatively moved from the extraction position to the transfer position, the separation member configured to be moved to adapt spatially to the first flange and the second flange, the separation member comprising an engaging portion that is movable to a first position for engaging with the first flange and movable to a second position for engaging with the second flange.

19. A method for handling selectively a first capsule having a first flange and a second capsule having a second flange having a dimension that is greater than a dimension of said first flange with a device comprising a first part and a second part that are relatively movable from a transfer position for inserting and/or removing such capsule to an extraction position for extracting such capsule, a separation member for separating the capsule from at least one of the first and second parts, in the at least one of the first and second parts, when the first and second parts are relatively moved from the extraction position to the transfer position, the separation member comprising an engaging portion that is movable to a first position for engaging with the first flange and movable to a second position for engaging with the second flange, the method comprising:
separating by the separation member the capsule from at least one of the device's first and second parts; while relatively moving the first and second parts from the extraction position to the transfer position,
moving the separation member to adapt spatially to the first flange; and
moving the engaging portion to a first position for engaging with the first flange.

20. The method of claim 19 comprising removing the capsule from inbetween the first and second parts.

* * * * *